United States Patent [19]
Akahane et al.

[11] Patent Number: 6,038,523
[45] Date of Patent: Mar. 14, 2000

[54] POSITION DETECTOR, ENCODER BOARD, POSITION DETECTING METHOD, TIMER AND ELECTRONIC DEVICE

[75] Inventors: Hidehiro Akahane; Noriaki Shimura, both of Suwa, Japan

[73] Assignee: Seiko Epson Corporation, Tokyo, Japan

[21] Appl. No.: 09/000,397

[22] PCT Filed: May 23, 1997

[86] PCT No.: PCT/JP97/01758

§ 371 Date: Jan. 23, 1998

§ 102(e) Date: Jan. 23, 1998

[87] PCT Pub. No.: WO97/45705

PCT Pub. Date: Dec. 4, 1997

[30]   Foreign Application Priority Data

May 24, 1996  [JP]  Japan ..................................... 8-130422

[51] Int. Cl.[7] .............................. G01D 5/249; G04C 3/00; G04C 9/00
[52] U.S. Cl. ............................. 702/150; 73/1.43; 368/73; 368/250
[58] Field of Search ............................. 702/150; 73/1.43, 73/1.79; 368/124, 126, 163, 250, 252, 73, 74, 75

[56]   References Cited

U.S. PATENT DOCUMENTS

| | | | |
|---|---|---|---|
| 4,374,622 | 2/1983 | Kashio | 368/74 |
| 4,914,437 | 4/1990 | Kibrick et al. | 341/3 |
| 5,418,362 | 5/1995 | Lushby et al. | 250/231.18 |
| 5,438,330 | 8/1995 | Yamazaki et al. | 341/11 |
| 5,825,307 | 10/1998 | Titus et al. | 341/13 |

FOREIGN PATENT DOCUMENTS

| | | |
|---|---|---|
| 0 391 058 | 10/1990 | European Pat. Off. . |
| 32 28 810 | 3/1990 | Germany . |
| 47-18351 | 9/1972 | Japan . |
| 57-175211 | 10/1982 | Japan . |
| WO 96/08694 | 3/1996 | WIPO . |

*Primary Examiner*—Kamini Shah
*Attorney, Agent, or Firm*—Stroock & Stroock & Lavan LLP

[57]   ABSTRACT

In a compact, highly precise position detecting apparatus which can perform automatic detection of a hand position, which is required to add a function such as automatic time correction to a time-measuring apparatus, an identification pattern (20) in which identification marks are discretely disposed on a surface of a center wheel (17) moving together with a minute hand (12), which serves as an encoder surface, is formed by hard-magnetic thin film, and sampling is performed by a magnetic sensor (21b) at a plurality of sampling points to determine whether identification marks are provided. The detection signal of the magnetic sensor at each sampling point is classified into three data, "1" and "0" indicating whether identification marks are provided or not, and "*" indicating that identification marks are indefinite. A sampling code obtained by data sampled at the plurality of sampling points is compared with reference identification codes to determine the position. The identification pattern is disposed under a rule concerning sampling points to allow indefinite data to be error-corrected.

19 Claims, 7 Drawing Sheets

Fig. 5

| POINT | IDENTIFICATION CODE | POINT | IDENTIFICATION CODE |
|---|---|---|---|
| 01 | 100000011001 | 31 | 011111100110 |
| 02 | 000000110011 | 32 | 111111001100 |
| 03 | 000001100110 | 33 | 111110011001 |
| 04 | 000011001100 | 34 | 111100110011 |
| 05 | 000110011001 | 35 | 111001100110 |
| 06 | 001100110011 | 36 | 110011001100 |
| 07 | 011001100111 | 37 | 100110011000 |
| 08 | 110011001111 | 38 | 001100110000 |
| 09 | 100110011111 | 39 | 011001100000 |
| 10 | 001100111111 | 40 | 110011000000 |
| 11 | 011001111111 | 41 | 100110000000 |
| 12 | 110011111111 | 42 | 001100000000 |
| 13 | 100111111110 | 43 | 011000000001 |
| 14 | 001111111100 | 44 | 110000000011 |
| 15 | 011111111001 | 45 | 100000000110 |
| 16 | 111111110011 | 46 | 000000001100 |
| 17 | 111111100111 | 47 | 000000011000 |
| 18 | 111111001111 | 48 | 000000110000 |
| 19 | 111110011110 | 49 | 000001100001 |
| 20 | 111100111100 | 50 | 000011000011 |
| 21 | 111001111001 | 51 | 000110000110 |
| 22 | 110011110011 | 52 | 001100001100 |
| 23 | 100111100111 | 53 | 011000011000 |
| 24 | 001111001111 | 54 | 110000110000 |
| 25 | 011110011111 | 55 | 100001100000 |
| 26 | 111100111111 | 56 | 000011000000 |
| 27 | 111001111110 | 57 | 000110000001 |
| 28 | 110011111100 | 58 | 001100000011 |
| 29 | 100111111001 | 59 | 011000000110 |
| 30 | 001111110011 | 60 | 110000001100 |

…

POSITION DETECTOR, ENCODER BOARD, POSITION DETECTING METHOD, TIMER AND ELECTRONIC DEVICE

TECHNICAL FIELD

The present invention relates to a position detecting apparatus using an encoder plate for detecting an absolute position, suited to detect the positions of the second hand and the minute hand of a timepiece, a position detecting method therefor, a time measuring apparatus having such a position detecting apparatus, and an electronic apparatus having such a position detecting apparatus.

BACKGROUND ART

It has been considered that a function for automatically correcting a time display is added to an analog-display-type time measuring apparatus having a second hand, a minute hand, or an hour hand. This function, which automatically corrects the time display, (hereinafter called an automatic time correction function) periodically obtains the standard time by radio or through a line, and corrects the displayed time so that it matches the standard time. The function is also used for adjusting the time to the current time if a time measuring function is stopped due to a cause such as a flat battery. With such an automatic time correction function being provided, the time display on a watch can be automatically adjusted to the local time at a trip destination, or a very precise time can be always indicated.

In these days, portable time measuring apparatuses, such as a watch, operating with a solar battery or in which electricity is generated by detecting the movement of a user's arm with the use of a weight have been developed. In such a time measuring apparatus which does not use a battery, if an electric power is not obtained from a solar battery or the like, it is considered that power consumption is reduced by stopping the motor for displaying the time and counting the time internally. When the time measuring apparatus uses an automatic time correction function, if the solar battery or the like starts generating electricity, the displayed time can be automatically and accurately adjusted to the current time which is counted internally.

To effectively use the automatic time correction function in an analog-display-type time measuring apparatus, it is preferred that a function for automatically detecting the displayed time be added. To reduce power consumption, the time immediately before the apparatus stops can be stored in internal memory or it is possible that the time being displayed is stored in internal memory and time correction is performed with that stored data. Time correction cannot be performed automatically and precisely, however, if the user changes a hand position with the crown while the apparatus is being stopped, if the contents of the memory is lost due to a flat battery, or if a hand-movement error occurs during fast winding for time correction.

To automatically detect the time currently displayed, for example, in a time measuring apparatus having a second hand for indicating the second, a minute hand for indicating the minute, and an hour hand for indicating the hour, it is required to identify the position where each hand is pointing. To this end, it is possible to use an encoder plate which rotates together with each hand. It is considered that the fourth wheel, the center wheel, and the hour wheel driving the second hand, the minute hand, and the hour hand, respectively, are used as encoder plates. It is required to detect sixty positions for each hand precisely, namely at a pitch of six degrees, in order to identify the positions where the second hand and the minute hand are pointing. Since six-bit positional information is enough for identifying sixty positions, it is considered that the positional information is marked on encoder plates at a pitch of six degrees and the positional information is detected. With this method, however, if one detecting apparatus detects one bit, it is necessary to provide six detecting apparatuses for each encoder plate. The detecting apparatuses are too large to be accommodated into a portable time measuring apparatus such as a watch. On the other hand, it can also be considered that an encoder plate which stores positional information as magnetic information like a magnetic recording medium is used. However, it is practically difficult to accommodate the same mechanism as a floppy disk in a watch in order to detect correct magnetic information, and the watch becomes large and expensive if it is provided. With a mechanism in which information is read while a magnetic recording medium is rotating, it is impossible to detect the position where a hand such as an hour hand that moves at a low speed stops.

Accordingly, it is an object of the present invention to provide a position detecting apparatus for detecting an absolute position with a precision of a pitch of six degrees or less by the use of a compact, simple mechanism which can be accommodated into a compact, portable apparatus such as a watch, and a position detecting method therefor. Another object is to provide a compact position detecting apparatus for detecting an absolute position precisely within a short period of time with a simple configuration and a position detecting method therefor.

DISCLOSURE OF INVENTION

In the present invention, an encoder plate on which a plurality of identification marks are discretely made such that the marks are detectable from a surface thereof are employed and an absolute position is detected by obtaining identification information indicating an indicated position by a plurality of sampling operations for the identification marks while the encoder plate is moved, or repeatedly moved and stopped. A position detecting apparatus according to the present invention is characterized by including: an encoder plate on which a plurality of identification marks are discretely made such that the identification marks are detectable from a surface thereof; an identification-mark detecting apparatus which can detect the identification marks; and an identification apparatus which can identify an indicated position on the encoder plate which the identification-mark detection apparatus faces, according to a sampling code, which is a sequential data string, obtained by sampling at a plurality of sampling points (detection points) to determine whether the identification marks are provided while the encoder plate and the identification-mark detecting apparatus are relatively moved.

A position detecting method according to the present invention is characterized by including a position detecting step in which against an encoder plate on which a plurality of identification marks are discretely made such that the identification marks are detectable from a surface thereof, an identification-mark detecting apparatus which can detect the identification marks is relatively moved, or repeatedly moved and stopped, or while it is moved, and an indicated position on the encoder plate which the identification-mark detection apparatus faces is identified according to a sampling code obtained by sampling at a plurality of sampling points to determine whether the identification marks are provided.

In a position detecting apparatus and a position detecting method of the present invention, an indicated position can be identified by sampling discretely made identification marks a plurality of times continually and sequentially. Therefore, it is not necessary to provide information uniquely indicating an indicated position at each indicated position on an encoder plate. An identification mark to be made at each indicated position on the encoder plate needs to be, for example, one-bit data. Since a sampling code having a plurality of bits is obtained by sampling the identification mark a plurality of times, it is possible to obtain data having the specified number of bits required for identifying 60 or more indicated positions. Of course, data having a plurality of bits may be provided at an indicated position. Since information uniquely indicating each indicated position is not required in a position detecting apparatus of the present invention, it can be made compact and its configuration can be simplified. In other words, since an identification mark made at each indicated position may be one-bit data, an identification-mark detecting apparatus for detecting the identification mark is required to have just one sensor. Therefore, the position detecting apparatus is very simplified and the error-detection rate becomes very low, and its reliability becomes high.

Since a sampling code having a amount of information enough to identify an indicated position is obtained by detecting identification marks sequentially at a plurality of sampling points in a position detecting apparatus according to the present invention, the relative speed of the movement of the encoder plate may be low, and data indicating an indicated position can be obtained even if the encoder plate is moved in a step manner. Therefore, the apparatus can be accommodated into a compact, portable apparatus such as a watch, and precision required for detecting a hand position of a time-measuring apparatus can be sufficiently assured.

It is preferred that an identification apparatus be provided with an identification-mark determination apparatus which outputs at each sampling point so as not to interpret an indicated position erroneously due to data in which the identification marks are erroneously detected, a first data indicating that it is confirmed that an identification mark is provided, a second data indicating that it is confirmed that no identification mark is provided, or a third data indicating that it cannot be confirmed that an identification mark is provided, and a decoder for decoding a sampling code, which is a plurality of data groups, formed by any of the first, second, or third data obtained from the identification-mark determination apparatus to identify an indicated position. By outputting the third data which indicates that it cannot be confirmed that an identification mark is provided, the decoder can identify an indicated position while the encoder plate is moved, until a sampling code not having the third data is obtained. It may be performed that a relatively long sampling code including a redundant bit is obtained and an indicated position is identified from the first and second data with the third data being ignored. As described later, it is also possible that the third data is corrected by the use of data rules and a sampling code is decoded.

An identification-mark detecting apparatus may be configured such that it is provided with a sensor which can output a detection signal of which the signal level increases or decreases according to whether an identification mark is provided or not, the identification apparatus is provided with a first comparison apparatus for outputting the first data when the detection signal is higher than a first reference signal and a second comparison apparatus for outputting the second data when the detection signal is lower than a second reference signal which is lower than the first reference signal, and the third data is output when the first or the second data is not output.

The level of a detection signal output from the identification-mark detecting apparatus changes due to the assembly conditions of the encoder plates and the identification-mark detecting apparatus, a difference in the identification-mark detecting apparatus, and environmental conditions such as a temperature difference at detection. Therefore, to perform position detection positively and precisely even if environmental conditions vary, it is preferred that the first reference signal of the identification-mark detecting apparatus is higher than the maximum value of a detection signal output when no identification mark is provided, and the second reference signal is lower than the minimum value of a detection signal output when an identification mark is provided. The maximum value and the minimum value of the detection signal refers to those obtained with a change in the detection signal due to a change in environmental conditions being taken into consideration.

To determine whether an identification mark is provided by comparing a detection signal output from the identification-mark detecting apparatus with the first or second reference signal, it is useful to provide an environmental-condition detecting apparatus which can detect an environmental condition and has substantially the same characteristics as the identification-mark detecting apparatus for the same object to be measured, and a compensation apparatus for compensating at least one of the reference signal and the detection signal according to the detection result of the environmental-condition detecting apparatus. With these apparatuses, since the effects of environmental conditions such as external noise and temperature changes are canceled, the detection signal can be classified more accurately and an absolute position can be positively and precisely determined within a short period of time.

It is effective that the prescribed rules are specified between identification marks and sampling points, the third data is corrected with the use of the rules, and an indicated position is identified by the use of a sampling code including corrected data. When an encoder plate is provided with an identification mark including an even number of ideal sampling points or detection points (ideal sampling points) where the sampling is to be performed with a space including an even number of the ideal sampling points being placed next to the identification mark, and a sampling code sampled such that a plurality of (two or more) boundaries between these identification mark and space are passed through is employed, for example, a sampling code having an even number of the first or second data arranged from one boundary to the other boundary is ideally obtained. By the use of this rule, the third data can be corrected to the first or second data in the following way.

1. Move the encoder plate, perform the specified number of sampling at positions including a plurality of boundaries of identification marks, and obtain at each sampling point a first data indicating that it is confirmed that an identification mark is provided, a second data indicating that it is confirmed that no identification mark is provided, or a third data indicating that it cannot be confirmed that an identification mark is provided.

2. If the third data is found, create a data group (sampling code) corrected by the number of the first or second data before and after the third data.

3. Decode the obtained sampling code (data group) to determine the indicated position. Decoding is performed with a table in which indicated positions and data groups (reference sampling codes, identification codes) corresponding thereto are stored in advance, and the indicated position is obtained by comparing the obtained sampling code with stored reference sampling codes.

Since a correct data group indicating the indicated position is obtained by performing error correction with the use of the data rules described above, it is not necessary to move the encoder plate until a sampling code having the first and second data only is obtained. An accurate position is detected within a short period of time with less energy.

It is possible to specify a rule that an identification mark and a space include an odd number of sampling points. It is also possible to specify a rule that an identification mark includes an even number of sampling points and a space includes an odd number of sampling points, or vice versa. In these cases, when it is considered that data may become indefinite, it is necessary to assign an odd number three or above of sampling points to each of an identification mark and a space. The number of bits in an identification code tends to increase. Therefore, when a rule that an even number of sampling points are assigned to an identification mark and a space is employed, the identification pattern is more simplified.

When the identification apparatus of a position detecting apparatus according to the present invention outputs only one of the first and second data, it is important to use an identification mark having such a rule. If the obtained sampling code does not satisfy the rules of the first and second data, since it is understood that erroneous detection occurs, countermeasures can be taken such as obtaining a sampling code indicating the next indicated position by further sampling or identifying the indicated position by error correction.

With the assembly error of an encoder plate and an identification-mark detecting apparatus and a difference in a position detecting apparatus caused by the movement characteristics of the encoder plate being taken into consideration, a timing adjustment apparatus adjusts sampling timing with the use of the identification-mark detecting apparatus against the movement timing of a movement apparatus for moving the encoder plate in a step manner to shift an actual sampling point such as that on a boundary of an identification mark where it is difficult to determine whether an identification mark is provided, to a position close to an ideal sampling point where a clearer detection signal is obtained. More precise position detection can be performed.

It is effective to perform sampling at an interval finer than the resolution of a pointed position pointed by the encoder plate. With this sampling, since a larger amount of information is obtained for identifying the pointed position, it is easier to perform error correction and the pointed position can be precisely and positively detected within a short period of time.

When at least one of the encoder plate and the identification-mark detecting apparatus of such a position detecting apparatus rotates together with at least one of the second hand, the minute hand, and the hour hand of a time-measuring apparatus, the absolute position of the second hand, the minute hand, or the hour hand can be detected by identifying the indicated position on the encoder plate. Instead of the time-measuring apparatus, when the display apparatus of an electronic unit is moved together with the encoder plate, the position of the display apparatus can be precisely detected. With the use of an identification mark formed by magnetic thin film attached such that it can be detected from a surface of the encoder plate and an identification-mark detecting apparatus provided with a magnetic sensor, an inexpensive position detecting apparatus having high reliability can be provided.

When, as the hour hand and the minute hand of a time-measuring apparatus, an indicated position on a sub encoder plate for a minute hand which moves together with an encoder plate for an hour hand on which an identification mark is made such that it can be detected from a surface thereof is identified, it is preferred that a second position detecting process for identifying the indicated position on the sub encoder plate be performed following a position detecting process for identifying the indicated position on the encoder plate. By performing the second position detecting process after the indicated position on the encoder plate is identified, the obtained sampling code can be compared with reference sampling codes within a limited range indicating the indicated position on the sub encoder plate predicted from the indicated position on the encoder plate. Hence, the indicated position on the sub encoder plate can be identified within a further shorter period of time with a smaller number of sampling points.

BRIEF DESCRIPTION OF DRAWINGS

FIG. 5 is a view indicating each identification code assigned to each point by the identification pattern shown in FIG. 3.

BEST MODE FOR CARRYING OUT THE INVENTION

According to the drawings, an embodiment of the present invention will be described below.

[Outlined Configuration of an Apparatus]

Figure 1:
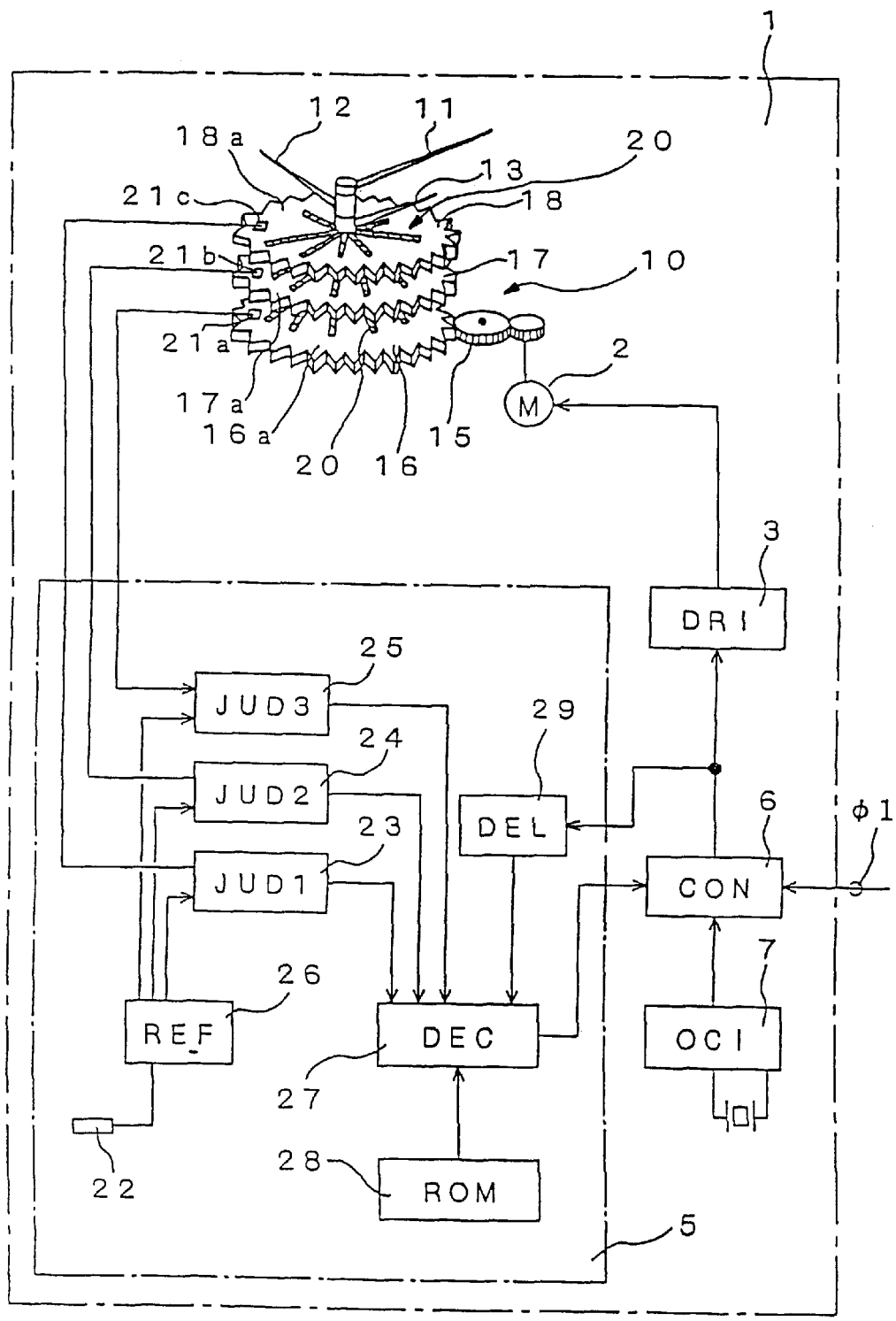
FIG. 1 is a block diagram indicating an outlined configuration of a time-measuring apparatus according to an embodiment of the present invention.

FIG. 1 shows an outlined configuration of a time measuring apparatus which can perform automatic time correction by the use of a position detecting function according to the present invention. The time measuring apparatus 1 according to the present embodiment is equipped with a stepper motor 2 for moving hands and a driving circuit (DRI) 3 for driving the stepper motor 2. The driving circuit 3 conducts normal time display with the use of 1-Hz driving pulses and can perform fast forward of hands with the use of fast-forward pulses having a frequency of 32 Hz or the like.

The stepper motor 2 can drive a second hand 11, a minute hand 12, and an hour hand 13 by the use of a wheel train 10. The stepper motor 2 drives a fifth wheel 15 through a pinion and then drives, a fourth wheel 16, a third wheel (not shown), a center wheel 17, a back-side wheel (not shown), and an hour wheel 18 in this order. The second hand 11 moves together with the fourth wheel 16, the minute hand 12 moves together with the center wheel 17, and the hour hand 13 moves together with the hour wheel 18. Surfaces 16a, 17a, and 18a of the fourth wheel 16, the center wheel 17, and the hour wheel 18 have the same function as an encoder plate. On each of the surfaces 16a, 17a, and 18a, an identification pattern 20 having the specified identification marks is made by the use of hard magnetic thin film such as magnetic ink.

Above the surfaces (encoder surfaces) 16a, 17a, and 18a which have the same function as an encoder plate, magnetic sensors 21a, 21b, and 21c serving as identification-mark detecting apparatuses are disposed opposite the magnetic pattern (identification pattern) 20, at positions where whether the identification marks of the identification pattern 20 are provided can be detected. The detection signal φ0 of each of these magnetic sensors 21a, 21b, and 21c is analyzed in an identification section 5, and the absolute positions (indicated positions) where the magnetic sensors 21a, 21b, and 21c oppose the encoder surfaces 16a, 17a, and 18a are identified. The indicated positions are output to a control section (CON) 6.

Since the indicated positions on the encoder surfaces 16a, 17a, and 18a are identified, the positions to which the second hand 11, the minute hand 12, and the hour hand 13 point are determined. The control section 6 uses the motor driving circuit 3 to fast forward the hands according to the positions of the hands, and perform automatic time correction according to a signal φ1 sent from the outside and indicating the standard time. Of course, it is possible to reverse the hands 11, 12, and 13 by providing a reverse function for the motor driving circuit 3. The control section 6 receives a clock signal from an oscillation circuit (OCI) 7. The control section 6 fast forwards the hands according to this clock signal and moves the hands normally according to the clock signal after the time is corrected.

The detection signals φ0 output from the magnetic sensors 21a, 21b, and 21c disposed opposite the encoder surfaces 16a, 17a, and 18a are handled by three determination sections (JUD1) 23, (JUD2) 24, and (JUD3) 25 provided for the identification section 5. These determination sections 23, 24, and 25 manipulate data and send it to a decoder section (DEC) 27. When the specified number of data items are accumulated for the encoder surfaces 16a, 17a, and 18a in the decoder section 27, the decoder section 27 identifies the indicated positions on the encoder surfaces 16a, 17a, and 18a among the accumulated data group according to a code table stored in a ROM 28, and outputs information concerning the detected positions to the control section 6.

The decoder section 27 reads (samples) data in synchronization with the timing of the movement of the encoder surfaces 16a, 17a, and 18a which are rotated stepwise by the stepper motor 2. In the present embodiment, since the identification section 5 is provided with a timing adjustment circuit (DEL) 29 which sets a delay time for a driving signal sent from the control section 6 to the motor driving circuit 3, data sampling timing can be controlled against the timing at which the control section 6 drives the motor through the motor driving circuit 3.

The identification section 5 according to the present embodiment is equipped with a reference-signal output section (REF) 26 for outputting a reference signal used for determining detection signals in the determination sections 23, 24, and 25. The reference-signal output section 26 receives a signal output from a magnetic sensor 22 disposed at a position away from the encoder surfaces 16a, 17a, and 18a. The level of a reference signal sent from the reference-signal output section 26 is compensated for by the use of a detection result of the magnetic sensor 22 to remove the effects of surrounding conditions such as noise and temperature changes.

Figure 2:
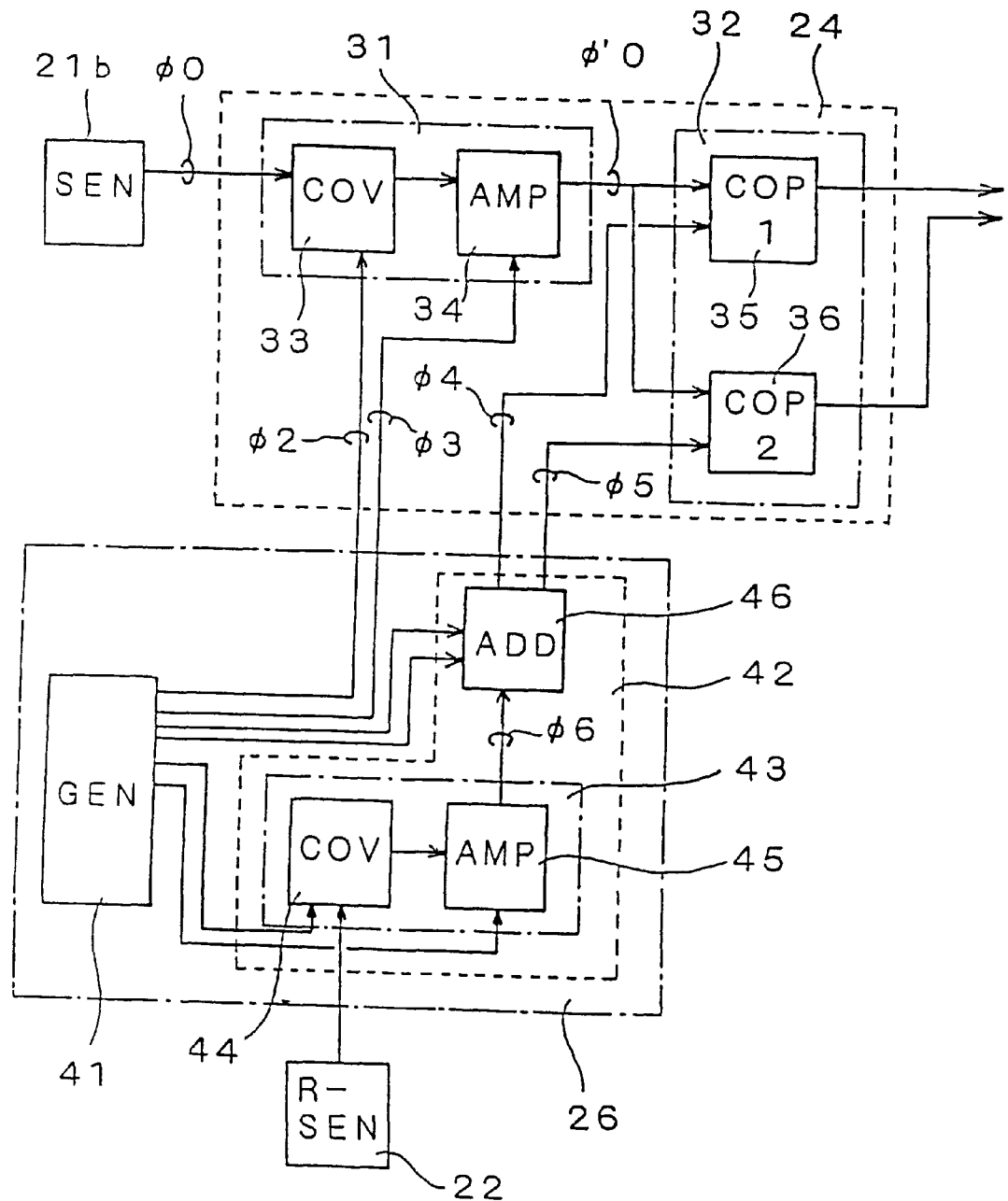
FIG. 2 is a block diagram indicating more details of the configuration of a determination section for a minute hand and a reference-signal output section in the identification section of the time-measuring apparatus shown in FIG. 1.

FIG. 2 illustrates a detailed configuration of the determination sections 23, 24, and 25, and the reference-signal output section 26. Since the determination sections 23, 24, and 25 can employ the same configuration, only the determination section 24, which identifies the position of the encoder surface 17a moving together with the minute hand 12, is shown in FIG. 2 as an example. The determination section 24 includes an amplifying circuit 31 for amplifying a detection signal sent from the magnetic sensor (SEN) 21b and for calibrating a difference among magnetic sensors, and a determination circuit 32 for determining whether an identification mark is provided by the use of the amplified detection signal.

The amplifying circuit 31 of the present embodiment has a single-end conversion circuit (COV) 33 for converting the differential voltage of the detection signal φ0 obtained from the magnetic sensor 21b to a voltage relative to the reference voltage of a reference signal φ2 sent from the reference-signal output section 26, and a preamplifier (AMP) 34 for further amplifying the voltage amplified by the single-end conversion circuit 33. Since the differential voltage of the detection signal φ0 obtained from the magnetic sensor 21b is very small, the single-end conversion circuit 33 converts the differential voltage to a detection signal having a voltage difference based on the reference voltage of the reference signal φ2, and at the same time amplifies the output voltage by a factor of about 2 to 100 times. The voltage of the reference signal φ2 sent to the single-end conversion circuit 33 can be adjusted to any level. The voltage of a reference signal φ3, which gives a reference voltage to be amplified by the preamplifier 34, can be fixed to a voltage different from that of the reference signal φ2 sent from the reference-signal output section 26 to the single-end conversion circuit 33. Therefore, by adjusting the voltage of the reference signal φ2 used in the single-end conversion circuit 33 by the reference-signal output section 36, the voltage not including an offset component generated in the differential voltage of the detection signal φ0 obtained from the magnetic sensor 21b can be amplified in the preamplifier 34. Since the preamplifier 34 includes an amplification-factor adjustment circuit, a sensitivity difference of the magnetic sensor 21b, a mounting condition against the encoder surface 17a, and a variation in strength of the detection signal φ0 caused by the condition of the identification marks put on the encoder surface 17a can be calibrated by adjusting the amplification factor. As described above, with the use of the amplification circuit 31 according to the present embodiment, a difference in the characteristics of magnetic sensors and a difference in mounting conditions against the encoder surfaces are calibrated and detection signals φ'0 amplified based on the specified voltage level can be obtained.

The determination circuit 32 according to the present embodiment, which determines from a detection signal whether an identification mark is provided, has two comparison circuits 35 (COP1) and 36 (COP2). The detection signals φ'0 amplified based on the specified voltage level is compared with a first reference signal φ4 and a second reference signal φ5 in the comparison circuits 35 and 36, respectively. The first and second reference signals φ4 and φ5 are sent from the reference-signal output section 26, and the first reference signal φ4 is set to a higher voltage than the second reference signal φ5 in this embodiment. The comparison circuits 35 and 36 output a high-level signal when the detection signal φ'0 is higher in voltage than the first and second reference signals φ4 and φ5, and output a low-level signal when the detection signal φ'0 is lower in voltage than the first and second reference signals φ4 and φ5.

The outputs of the comparison circuits 35 and 36 are sent to the decoder section 27. When the decoder section 27 receives two high-level signals from both comparison circuits 35 and 36, it gets a first data, which indicates that it is confirmed that an identification mark is provided. In the present embodiment, the first data is hereinafter indicated by "1." When both outputs of the comparison circuits 35 and 36 are low-level signals, the decoder section 27 gets a second data, which indicates that it is confirmed that no identification mark is provided. In the present embodiment, the second data is hereinafter indicated by "0." Since a voltage difference is set between the reference signals φ4 and φ5 for the comparison circuits 35 and 36, a case may happen in which the comparison circuit 35 outputs a low-level signal and the comparison circuit 36 outputs a high-level signal. The decoder section 27 handles this case with a third data, which indicates that it cannot be confirmed that an identification mark is provided. The third data is hereinafter indicated by "*" described above, with the use of the determination circuit 32, a detection signal which is detected by the magnetic sensor 21b can be classified into three cases.

Reference signals φ2, φ3, φ4, and φ5 used for classifying a detection signal as described above are sent from the reference-signal output section 26. The reference-signal output section 26 in the present embodiment includes a reference-voltage generator (GEN) 41 for generating a plurality of reference signals having various voltages. Reference signals φ2 and φ3, sent from the reference-voltage generator 41, are used for adjusting the ground voltages of the single-end conversion circuit 33 and the preamplifier 34. By adjusting these two ground voltages, the preamplifier 34 amplifies the voltage with an offset voltage generated at a magnetic field of zero by the magnetic sensor 21b being removed.

The reference-voltage generator 41 also outputs the first and second reference signals φ4 and φ5, which are used for comparison in the comparison circuits 35 and 36. In the reference-signal output section 26 of the present embodiment, these first and second reference signals φ4 and φ5 are sent to the comparison circuits 35 and 36 through an adder (ADD) 46. The adder 46 increases or reduces the voltage levels of the first and second reference signals φ4 and φ5 according to the increase or decrease of the output voltage of the magnetic sensor (R-SEN) 22 mounted at a position away from the encoder surfaces 16a, 17a, and 18a in order to prevent the effects of external noise and temperature. In other words, the reference-signal output section 26 is provided with a compensation circuit 42 for compensating for the voltage levels of reference signals. The compensation circuit 42 includes an amplifying circuit 43 formed by a single-end conversion circuit (COV) 44 for calibrating the detection output of the magnetic sensor 22 and for amplifying it in the same way as described above, and a preamplifier (AMP) 45. A compensation signal φ6 output from the preamplifier 45 is sent to the adder 46, and the voltage levels of the reference signals φ4 and φ5 are adjusted in the adder 46.

The magnetic sensor 22, which sends a detection signal to the compensation circuit 42, is mounted at a position away from the wheel on which hard-magnetic thin film constituting an identification mark is formed. The electric signal output from the magnetic sensor 22 is changed only by a magnetic field from the outside of the timepiece. The signal amplification rate of the single-end conversion circuit 44 in the compensation circuit 42 is set equal to that of the single-end conversion circuit 33 in the determination section 24. The signal amplification rate of the preamplifier 45 in the compensation circuit 42 is also set equal to that of the preamplifier 34 in the determination section 24. Therefore, a circuit formed by the magnetic sensor 21b, the single-end conversion circuit 33, and the preamplifier 34 in the determination section 24 has nearly the same temperature characteristics as a circuit formed by the magnetic sensor 22, the single-end conversion circuit 44, and the preamplifier 45 in the compensation circuit 42. The difference between the outputs of two preamplifiers 34 and 45 hardly changes due to the temperature. Therefore, by adding the output of the preamplifier 45 to the reference voltages of reference signals φ4 and φ5 in the adder 46, the effects of the temperature on the detection signal output from the magnetic sensor 21b can be almost canceled in the comparison circuits 35 and 36. When an external magnetic field is applied to the magnetic sensor 21b, which is used for obtaining magnetic information from the hard-magnetic thin film, the output of the preamplifier 34 greatly changes due to this external magnetic field. With the use of the compensation circuit 42, since the output of the preamplifier 45 in the compensation circuit 42 also changes by the same voltage change as that of the preamplifier 34, and the voltages of reference signals φ4 and φ5 also change at the same time, the comparison circuits 35 and 36 can accurately detect only magnetic information obtained from the hard-magnetic thin film without the effects of the external magnetic field.

The magnetic sensor 22, which captures changes in the environmental conditions of the time measuring apparatus at a position away from the wheels, has substantially the same characteristics as the magnetic sensor 21b of the identification-mark detecting apparatus against the same objects to be measured, and can receive external magnetic noise applied to the magnetic sensor. Therefore, since an output including the noise is obtained from the preamplifier 45 of the compensation circuit 42, a change corresponding to the noise can be added to reference signals φ4 and φ5 in the adder 46, and the effects of the noise can be removed when a detection signal φ0 is classified.

As described above, since the reference-signal output section 26 of the present embodiment is provided with the magnetic sensor 22 for detecting only effects from the outside of the time-measuring apparatus, a changing component due to the effects of the outside environment can be removed from the detection signal of the magnetic sensor 21 for detecting an identification mark. Therefore, an identification mark can be precisely detected under any conditions. Instead of controlling reference signals φ4 and φ5, even when the detection signal φ0 of the magnetic sensor 21b is controlled according to the output of the compensation circuit 42, effects from the outside environment can be removed.

Since the voltage levels of reference signals φ2, φ3, φ4, and φ5 output from the reference-voltage output circuit 41 can be adjusted separately as required, the voltages of reference signals φ4 and φ5, which are used in the comparison circuits 35 and 36, can be adjusted according to the output voltage of the preamplifier 34, and the voltage levels of reference signals can be changed in a case when accurate detection becomes difficult in the comparison circuits 35 and 36 due to the temperature and other factors changing with the passage to time.

In FIG. 2, the determination section 24, which serves as a circuit for determining the position of the minute hand 12, is shown and it has been described. The configuration of the determination section 25 for determining the position of the second hand 11 and that of the determination section 23 for determining the position of the hour hand 13 are the same as that of the determination section 24. The reference-signal output section 26 sends reference signals also to the determination sections 23 and 25, and reference signals used in each comparison circuit are also compensated for in the same way. In the circuit shown in FIG. 2, the voltages of reference signals are controlled by the output of the compensation circuit 42 for compensating for effects from the outside environment. It is needless to say that the voltage of the detection signal φ'0 may be compensated for. Although not shown in FIG. 1 or FIG. 2, a constant-voltage circuit is provided for the time measuring apparatus 1 of the present embodiment. The constant-voltage circuit supplies power to each of the above circuits.

[Structure of an Identification Mark]

Figure 3:
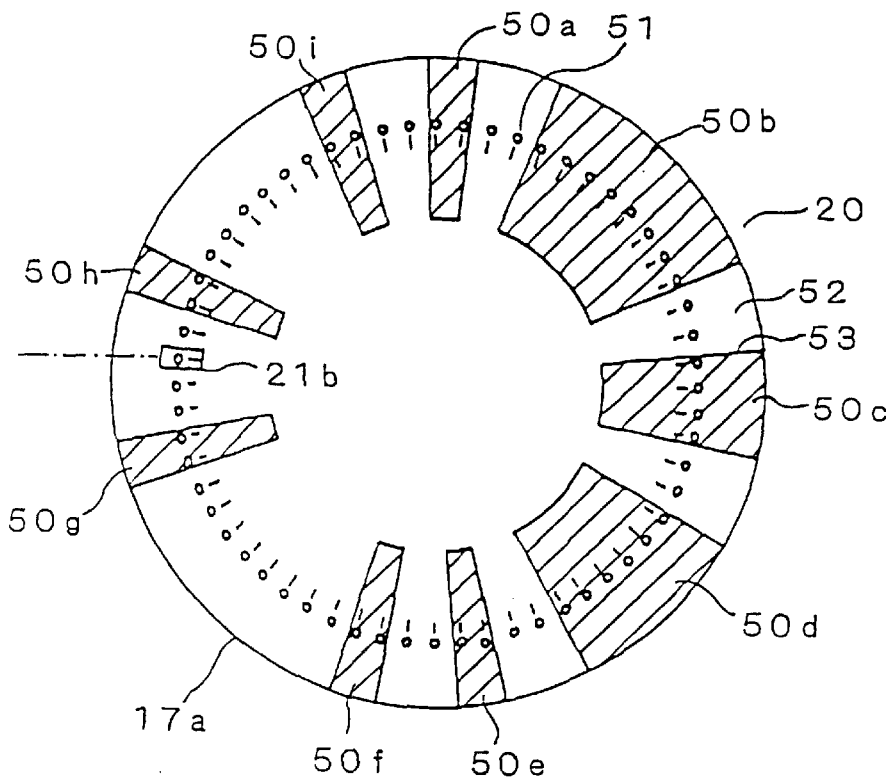
FIG. 3 is a view indicating an example of an identification pattern.

FIG. 3 shows an identification pattern marked on the encoder surface 17a and used for detecting the position of the minute hand 12 as an example of identification patterns 20 marked on the encoder surfaces 16a, 17a, and 18a. An identification pattern 20 of the present embodiment is formed on the surface of the center wheel 17. Nine identification marks 50a to 50i are disposed discretely along the circumference of the disc-shaped encoder surface 17a. These identification marks 50a to 50i are detected at sampling points (ideal sampling points) 51 made at a pitch of six degrees, by the magnetic sensor 21b in which a Hall device is used. This identification pattern 20 can be formed by hard-magnetic film made by magnetic ink. A magnetic sensor for detecting the pattern can be formed by a GaAs Hall device and can be made as very small as a 300-μm square. Therefore, the position detecting function of the present embodiment can easily be incorporated into the movement of the time-measuring apparatus 1. A detection mechanism for detecting hand positions can be integrated without changing the size of the time-measuring apparatus 1 at all, such as the thickness and the diameter. Since a position can be detected without any contact between the magnetic sensor 21b and the identification pattern 20 by employing a combination of a Hall device and the identification pattern formed by magnetic film, hands are moved without problems and design changes are unnecessary, such as changing the stepper motor 2 and the characteristics of the wheel train 10. By controlling the distance between the Hall device and the hard-magnetic film, since a voltage waveform shown in FIG. 4 which corresponds to a sufficiently precise identification pattern can be obtained, the processing of a detection signal is easy and a circuit required for the processing can also be simplified.

Each of the identification marks 50a to 50i constituting an identification pattern 20 are disposed radially from the center of the encoder surface 17 and magnetized in the direction perpendicular to the encoder surface. An indicated position where the magnetic sensor 21b faces the encoder surface 17a can be recognized by an absolute value. In the identification pattern 20 of the present embodiment, assuming that the 12-o'clock direction is set to 0 degrees and the angle is measured clockwise, identification mark 50a covers from 1 to 9 degrees, identification mark 50b covers from 25 to 69 degrees, identification mark 50c covers from 85 to 105 degrees, identification mark 50d covers 121 to 153 degrees, identification mark 50e covers from 169 to 177 degrees, identification mark 50f covers from 193 to 201 degrees, identification mark 50g covers 253 to 261 degrees, identification mark 50h covers from 289 to 297 degrees, and identification mark 50i covers 337 to 345 degrees. The ideal sampling points 51 are specified at a pitch of 6 degrees from point 01 which is positioned at two degrees to point 60.

Figure 4:
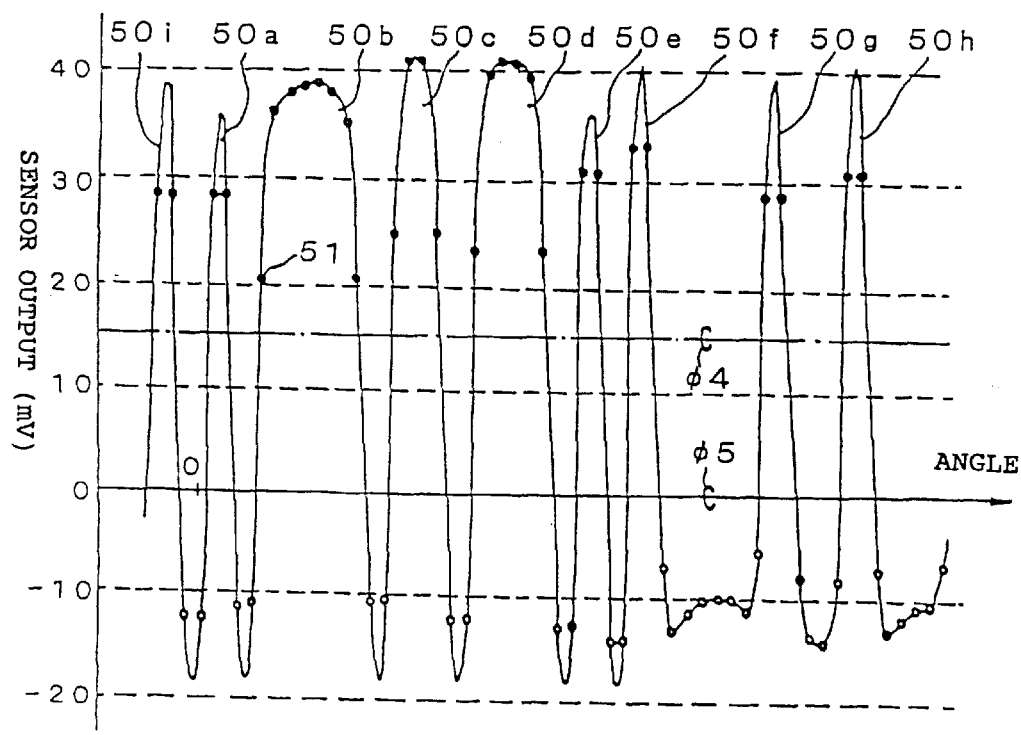
FIG. 4 is a graph showing a detection signal obtained when the identification pattern shown in FIG. 3 is detected.

FIG. 4 shows a detection signal φ'0 obtained by amplifying in the preamplifier a signal sent from the magnetic sensor 21b in a case when the encoder surface 17a on which the identification pattern 20 is marked is rotated at a pitch of six degrees. The signal level of the detection signal φ'0 shown in FIG. 4 is indicated by an output voltage. The signal level is adjusted by the amplifying circuit 31 of the determination section 24 such that it changes within a range of −20 mV to 40 mV. It is found from the signal level of the detection signal obtained from the magnetic sensor 21b at each sampling point 51 that an output voltage of about 20 mV or more is obtained when any of the identification marks 50a to 50i is detected and an output voltage of about −5 mV or less is obtained when the above identification marks are not detected. Therefore, by setting the voltage level of the first reference signal φ4 sent to the comparison circuit 35 of the determination circuit 24 to about 15 mV and the voltage level of the second reference voltage φ5 sent to the comparison circuit 36 to about 0 mV, data "1" or "0" is obtained at each of points 01 to 60.

FIG. 5 shows a data group (identification codes, reference sampling codes) 59 to be obtained at the ideal sampling points 01 to 60 when the magnetic sensor 21b detects the identification pattern 20 while the encoder surface 17a is rotated. The identification pattern 20 of the present embodiment is specified such that a total of 12 data values including the currently sampled data value and the 11 preceding sampling data values form a reference sampling code to identify the current point from points 01 to 60. Therefore, each identification code (reference sampling code) 59 shown in FIG. 5 is unique. A data group (sampling code) including 12 data items is decoded in the decoder section 27 by comparing it with the identification codes 59 shown in FIG. 5 and stored in advance in the ROM 28 to detect the indicated position as an absolute position.

The identification pattern 20 of the present embodiment is specified as understood from FIG. 3 or FIG. 5 such that an even number of sampling points 51 are assigned to each of the identification marks 50a to 50i, and an even number of sampling points 51 are assigned to a space 52 between two of the identification marks 50a to 50i. In other words, each of the identification marks 50a to 50i has a size in which an even number of sampling points 51 are included, and each identification mark is disposed with spaces 52 having an even number of sampling points 51 placed at both sides. The identification marks 51a to 50i are specified such that two boundaries 53 between the identification marks 51a to 51i and the spaces 52 must exist within the points corresponding to the identification code for each of the points 01 to 60. In other words, the identification pattern 20 of the present embodiment is specified such that the identification codes 59 are formed by data obtained at 12 sampling points 51, and sampling is performed at these 12 successive sampling points 51 with two boundaries 53 being passed through. With this structure, each identification code 59 includes data sampled at all points in at least one of the identification marks 50a to 50i or at least one of the spaces 52 between the identification marks.

By employing the above-described identification pattern 20 and the sampling method, each identification code 59 corresponding to each of the points 01 to 60 includes a data string in which an even number of "0's" or "1's" are arranged, excluding the start and end data strings. In other words, each identification code 59 has two or more combinations of a transition from "0" to "1" or a transition from "1" to "0", and an even number of "0's" or "1's" exist between transitions. Therefore, with the use of rules in the identification codes, element "*," which indicates that data is indefinite, can be corrected in a sampling code having "*" by the number of data values "0" or "1" arranged before and after "*" in the data string. For example, when a sampling code of "0*110*111111" is obtained, it is found from the above rules that all "*'s" are "0's," and this sampling code matches the identification code 59 for point 10. As a result, it is found that the indicated position is point 10.

The sampling method and the rules of the identification codes can be used for correcting a sampling code when the phase shifts between a position where the wheel on which the identification pattern 20 formed by hard-magnetic thin film is marked stops and the magnetic sensor 21b for detecting a magnetic field, in other words, when an actual sampling point shifts from the corresponding ideal sampling point 51 specified when the identification pattern 20 is designed. An indicated position can be precisely detected within a short period of time.

In the present embodiment, the encoder plates (encoder surfaces) equipped with the identification pattern 20 in which an even number of sampling points are included are used. It may be possible to employ encoder plates (encoder surfaces) equipped with an identification pattern in which an odd number of sampling points are included, or an odd number of sampling points in identification codes and an even number of sampling points in spaces are specified, or vice versa. To use the rules specified for an odd number of sampling points, it is required to include an odd number three or above of sampling points because, when there exists only one sampling point, if data obtained at the point becomes indefinite, it cannot be determined. Therefore, when an odd number of sampling points are used, since the amount of data included in sampling codes tends to increase, identification processing needs much time. It is hence preferred that the rules specified for an even number of sampling points be employed in a position detecting apparatus in which about 60 sampling points are specified for a time-measuring apparatus.

Figure 6:
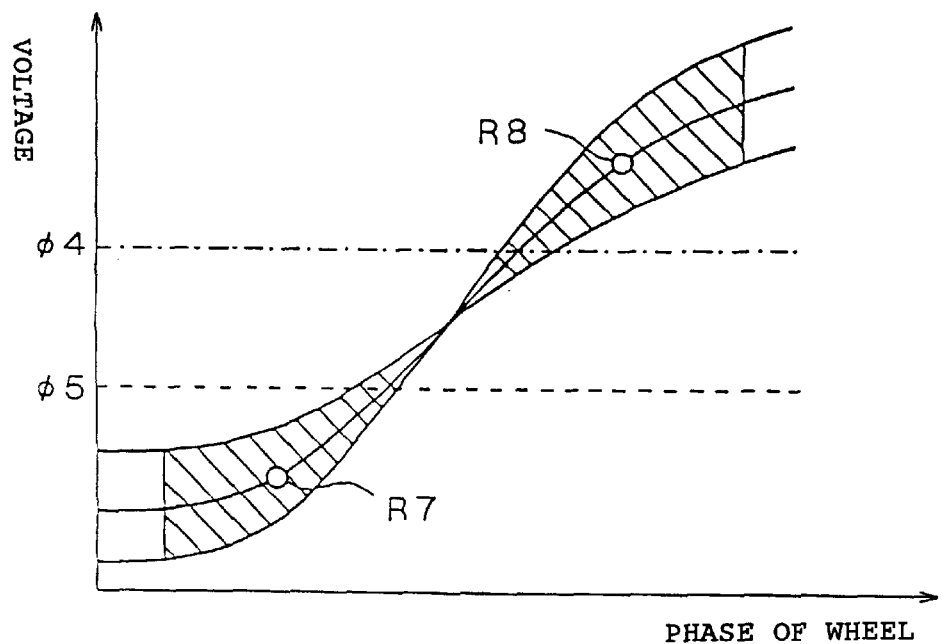
FIG. 6 is a graph showing a condition in which the output of the detection signal varies.

FIG. 6 shows the voltage changes of the detection signal φ'0 output from the magnetic sensor and amplified by the preamplifier 34, at the average stop position R7 for the specified sampling point on an encoder surface, namely, a wheel, and at the average stop position R8 of the next sampling point. An average stop position is specified at an average temperature (for example, at about 25° C.) for the use of the time measuring apparatus 1 with an average phase between a wheel provided with an encoder surface, for example, the center wheel 17, and the magnetic sensor 21b, and an average distance caused by the forcible movement and waviness of the wheel. The ideal sampling points 51 are specified with these average stop positions being set to the targets.

In contrast, when sampling is performed in an actual time-measuring apparatus, a stop position where sampling is performed slightly shifts from the average stop position R7 or R8 and the phase varies. An actual sampling point is thus determined. Therefore, the output of the magnetic sensor 21b changes and the voltage of the detection signal φ'0 obtained from the preamplifier 34 also varies. Even when a stop position where sampling is performed matches the average stop position R7 or R8, the voltage of the detection signal φ'0 obtained from the preamplifier 34 changes due to variation in the distance between the encoder surface 17a and the magnetic sensor 21b caused by the forced movement and waviness of the wheel 17, a change in the strength of the magnetic field of the hard-magnetic thin film which forms the identification pattern 20 caused by a temperature change at sampling, and a change in the magnetic sensitivity of the magnetic sensor 21b. Therefore, due to these various factors, the output of the detection signal φ'0 at the specified sampling point may vary in the hatched range in the figure against the outputs obtained at average stop positions R7 and R8.

Figure 7:
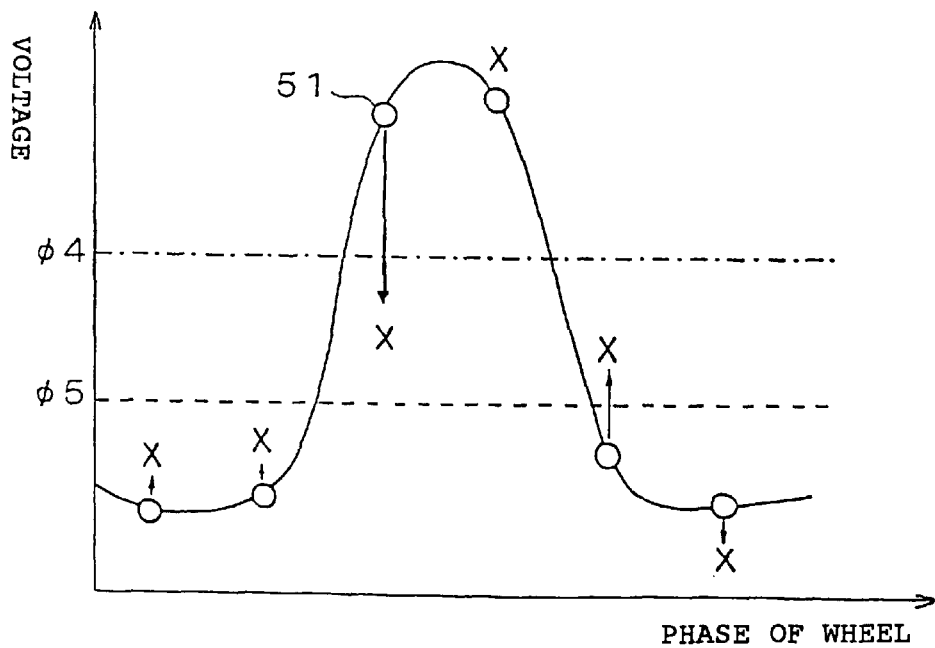
FIG. 7 is a graph showing a condition in which indefinite data is obtained due to an increase or decrease of the output of the detection signal.

Due to such a change in the voltage of the detection signal φ'0 at a sampling point, as shown in FIG. 7, when sampling is performed at the sampling point 51 disposed in the vicinity of the boundary 53 between the identification mark 50 and the space 52, the voltage (signal level) of the detection signal φ'0 may decrease, although ideally the signal has a high level, namely, "1." Conversely, the voltage (signal level) of the detection signal φ'0 may increase, although ideally the signal has a low level, namely, "0."

Since a detection system has such changes, when the output of the detection signal φ'0 at an actual sampling point is determined according to one reference voltage, for example, a sampling code of "001110111111" is obtained at point 10. It is found from a rule of the identification codes that an even number of "1's" or "0's" are arranged that the obtained sampling code has an erroneous detection, and it is determined from the fact that at least two boundaries 53 are included that the fifth data value is erroneous and it must be "0." However, when the level corresponding to the sixth data value decreases at point 24 and a sampling code of "001110001111" is obtained, for example, it is found that there is an erroneous detection, but the position of the data erroneously detected cannot be determined and hence the erroneously detected data value cannot be corrected. Since an identification code which is the nearest in length to the obtained sampling code cannot be determined, error correction cannot be done. Therefore, it is necessary to rotate the wheel until a sampling code which does not include an erroneously detected data value is obtained. When it is taken into consideration that a plurality of erroneously detected data values may be included, since a sampling code may accidentally include a data string which has an even number of "1's" or "0's," it is difficult to obtain an accurate decoding result.

In contrast, in the determination section 24 (also in the determination sections 23 and 25) of the present embodiment, the signal level of the detection signal φ'0 is determined by the use of two reference signals φ4 and φ5 having a voltage difference (signal-level difference) in the two comparison circuits 35 and 36. Therefore, in the above case at point 24, for example, a sampling code of "00111*001111" is obtained. Since the position of erroneous data value can be determined in the determination section 24 of the present embodiment, an identification code which is the nearest to the sampling code can easily be specified.

Therefore, it becomes possible to perform error correction without increasing the sampling points and to identify the indicated position within a short period of time. By the use of the determination section 24 which uses two reference signals φ4 and φ5, the indicated position can be identified with the small number of the sampling points in this way. Therefore, the determination section of the present embodiment is especially effective for detecting the positions pointed by the hour hand 13 and the minute hand 12 for which much time is required to increase sampling points, unlike the second hand 11. Since the hour hand 13 moves together with the second hand 11 and the minute hand 12, a long time is required to perform fast-forward of the hour hand in order to obtain the specified sampling code. In the time-measuring apparatus 1 of the present embodiment, since the position of an error in a sampling code can easily be identified as describe above, and error correction is performed with the use of the data rules, the positions of the hands can precisely be identified within a short period of time.

It is necessary to set the voltages (signal levels) of reference signals $\phi 4$ and $\phi 5$ for which a voltage difference is provided in order to identify the position of an error in a sampling code so that they do not overlap with the range of the variation of the detection signal $\phi'0$ described by referring to FIG. 6. Assuming that the stop position R7 is a sampling point, for example, since the data to be obtained as a detection result is "0" as shown in FIG. 7, it is required to set the voltage of reference signal $\phi 4$ such that value "1" is not output even if the detection signal $\phi'0$ changes due to various factors. On the other hand, assuming that the stop position R8 is a sampling point, since the data to be obtained as a detection result is "1," it is required to set the voltage of reference signal $\phi 5$ such that value "0" is not output even if the detection signal $\phi'0$ changes due to various factors. In other words, it is required that the level of the first reference signal $\phi 4$ be set to larger than the maximum value of the detection signal $\phi'0$ output by the magnetic sensor at a sampling point where an identification mark does not exist, and the level of the second reference signal $\phi 5$ be set to smaller than the minimum value of the detection signal $\phi'0$ output by the magnetic sensor at a sampling point where an identification mark exists. When these settings are specified, a data value at a sampling point where value "0" is to be detected becomes "0" or "*" (indefinite), and a data value at a sampling point where value "1" is to be detected becomes "1" or "*." Therefore, data value "1" is not obtained at a sampling point where data value "0" is to be detected, and data "0" is not obtained at a sampling point where data value "1" is to be detected, either. Irrespective of a situation in which an identification mark cannot be confirmed, an indicated position is not erroneously identified without recognizing the situation. Therefore, the positions which the hands point to are positively detected in the determination section 5 of the present embodiment.

Data which is not determined in a sampling code, namely, a sampling code including a plurality of "*'s," may not be error-corrected because an identification code which has the shortest distance to the sampling code cannot be found. When a sampling code of "**1100110011" is obtained, for example, possible identification codes include those at points 34 and 06, but the real identification code cannot be identified. In this case, by obtaining the data at the next sampling point, the indicated position can be detected. When the next data is "0," for example, the identification code at the next sampling point is "*110011001101" and it is found from the last 11 bits although the first data is not determined that the code matches the identification code at point 35. If the identification code having the shortest distance to a sampling code at the next sampling point 51 is not found, it is required to perform further sampling continually. This method is effective not only for a case in which an identification code is not uniquely determined from the detected sampling code, but for confirming the recognized identification code to increase the reliability of the detected data. By repeating sampling, since obtained data becomes redundant, error correction can be easily performed, and the indicated positions can be detected even when undetermined data increases.

When the positions (angles, indicated positions) of the second hand 11, the minute hand 12, and the hour hand 13 are determined at any timing during the movement of these hands in the time-measuring apparatus 1, the positions of the hands (movement positions) thereafter can be controlled with the use of a pulse count method in which the number of steps the stepper motor 2 operates from the determined positions is referred. Therefore, in the time-measuring apparatus 1, an identification mark is detected at a plurality of sampling points to form a sampling code and, from the point of time when a sampling code from which the positions of the hands are determined is obtained, control is changed to hand-position control by the number of steps the stepper motor 2 operates. As described above, the time-measuring apparatus is one of electronic apparatuses to which a position detecting apparatus and a position detecting method according to the present invention are applied to identify the positions of hands. With the use of a position detecting apparatus and a position detecting method of the present invention, even in a compact time-measuring apparatus such as a watch, the absolute positions of hands can be identified at any time.

Since it becomes easier to find the identification code having the shortest distance to the obtained sampling code by limiting the range of identification codes (reference sampling codes) with which the obtained sampling code is compared, it can be possible to identify the indicated position even if a plurality of undetermined data values are included. When there is provided encoder plates for the minute hand 12 and the hour hand 13 of the time-measuring apparatus 1 and these encoder plates move together with a constant phase difference therebetween being maintained, if the position of the hour hand 13 is determined, the position which the minute hand points may be estimated. In such a case, the indicated position on the encode surface 21c for the hour hand 13 is decoded in advance, and then the encoder surface 21b for the minute hand 12 is decoded as a sub encoder surface. The position which the minute hand 12 points is estimated to some extent from the position which the hour hand 13 points. Therefore, by comparing the estimated sampling code which indicates the estimated position which the minute hand 12 points with the obtained sampling code, the indicated position on the encoder surface 21b (sub encoder) for the minute hand 12 can easily be identified with a few sampling data values, or sampling data having many errors.

In other words, when the rough position of the minute hand 12 is found, the range of identification codes (reference sampling codes) with which the obtained sampling code is compared can be limited. Therefore, if a plurality of undetermined data values "*" is included, since the range of identification codes to be compared is narrow,the indicated position can be identified. When the above sampling code "**1100110011" is obtained as a sampling code for the minute hand 12, for example, and it has been found that the position of the hour hand 13 decoded in advance is located within a 30-minute (exclusive) position, it is easy to determine that the indicated position is point 34. Decoding becomes easier by increasing the number of sampling points or by limiting the range of identification codes to be compared with from the pointed position pointed by another hand. Therefore, although the sampling time extends, the pointed position can be identified even with the use of an identification pattern from which data having no rules is obtained as described above as identification codes.

[Adjusting Sampling Timing]

Figure 8:
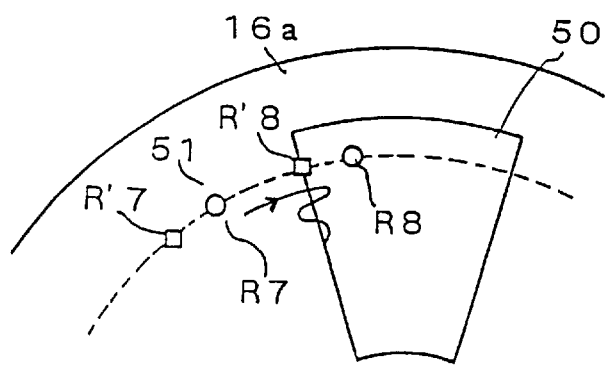
FIG. 8 is a view showing a condition in which sampling points are shifted.
Figure 9:
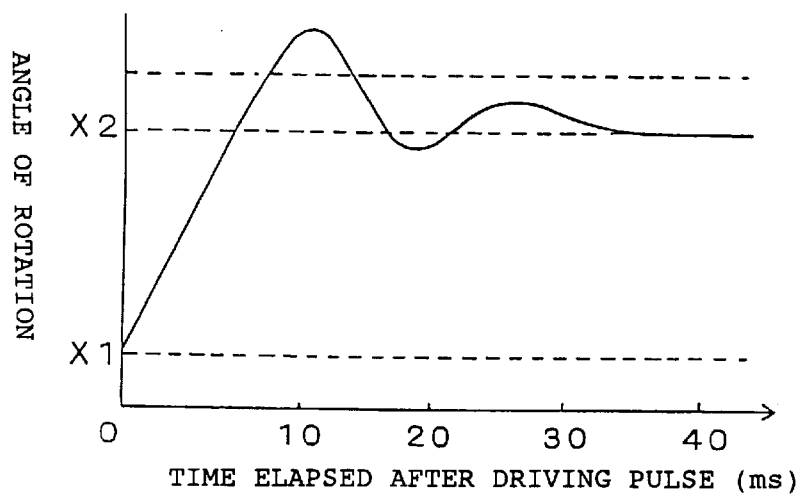
FIG. 9 is a view showing a process in which an encoder plate is moved by a stepper motor.

The encoder surface 16a, which is one of the encoder surfaces of the present embodiment and indicates the position pointed by the second hand, is driven by the stepper motor 2 step by step. Therefore, the encoder surface 16a roughly moves from a certain sampling point to the next sampling point as shown in FIG. 9. Assume that sampling points of the magnetic sensor 21a shift from average stop positions (ideal sampling points) R7 and R8 counterclockwise to R'7 and R'8 as shown in FIG. 8. In this case, it is highly possible that data obtained from the detection signal $\phi 1$ sampled at R'8, which is close to a boundary 53, becomes indefinite "*" as described above. In contrast, the wheel 16 is moved by the stepper motor 2 for about 30 to 40 ms as shown in FIG. 9 and vibrates during the period as shown in FIG. 9. Therefore, by performing sampling at the specified timing during the period from when pulses for driving the stepper motor 2 are sent to when the encoder surface 16a rotates and stops, data can be obtained when the magnetic sensor 21a is positioned above the identification mark 50. The data is prevented from being indefinite "*."

Figure 10:
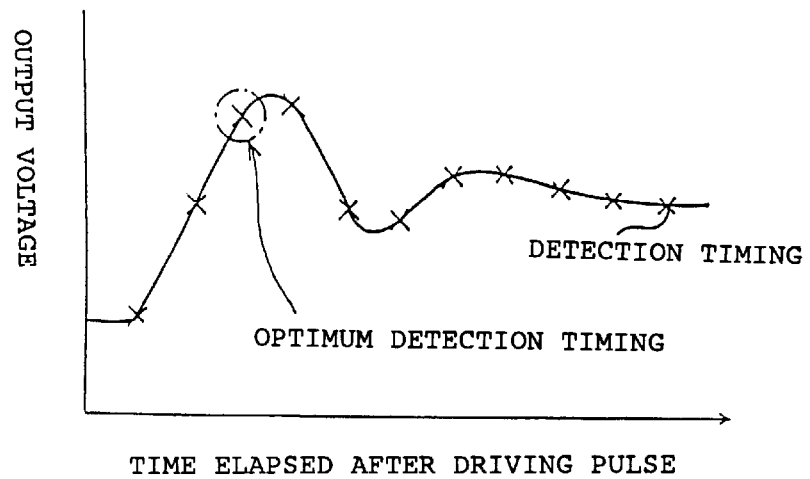
FIG. 10 is a graph indicating detection timing for a plurality of sampling operations specified during the movement of the encoder plate.

The identification section 5 of the present embodiment is provided with a timing adjustment circuit 29. The circuit finds from the control section 6 that motor driving pulses shown in FIG. 10 are output, and can specify in advance 10 to 20 detectable timing points during the period from when the pulses are output to when the wheel stops. Therefore, by specifying sampling timing such that sampling codes having the least number of indefinite data values are obtained, whether identification mark 50 is provided or not can be detected at the same precision as in a case when the encoder surface stops at an ideal sampling point 51. By providing such a timing adjustment circuit 29 and adjusting timing at the sampling side, troublesome work can be eliminated such as fine adjustment of a wheel stop position and fine adjustment of the position of the magnetic sensor 21. In addition, once the timing is set, it is not necessary to select timing again unless the wheel stop position changes due to some factor. Since the phase relationship between the encoder plate and the magnetic sensor at each sampling point is nearly the same, it is not necessary to select timing at each sampling point, and more precise sampling codes can be obtained by setting nearly equal the interval from when motor driving pulses are output to each sampling.

Since the number of sampling data can be increased by setting a sampling timing interval shorter than the time corresponding to the resolution of the indicated positions, error correction becomes easier to achieve and more precise position detection is performed. It is required in terms of knowing the hour of the time to find which 12 divided position the hour hand 13 points. With the use of the above-described identification pattern, the indicated position can be identified with 60 divided sampling points. Therefore, the distance the hour hand is moved for determining the position can be shortened against the resolution of the hand, and highly precise data is obtained within a short period of time.

Although the timing adjustable period differs according to the rotation speed of an encoder plate, it is needless to say that the same advantages are obtained.

[Position Detecting Method]

Figure 11:
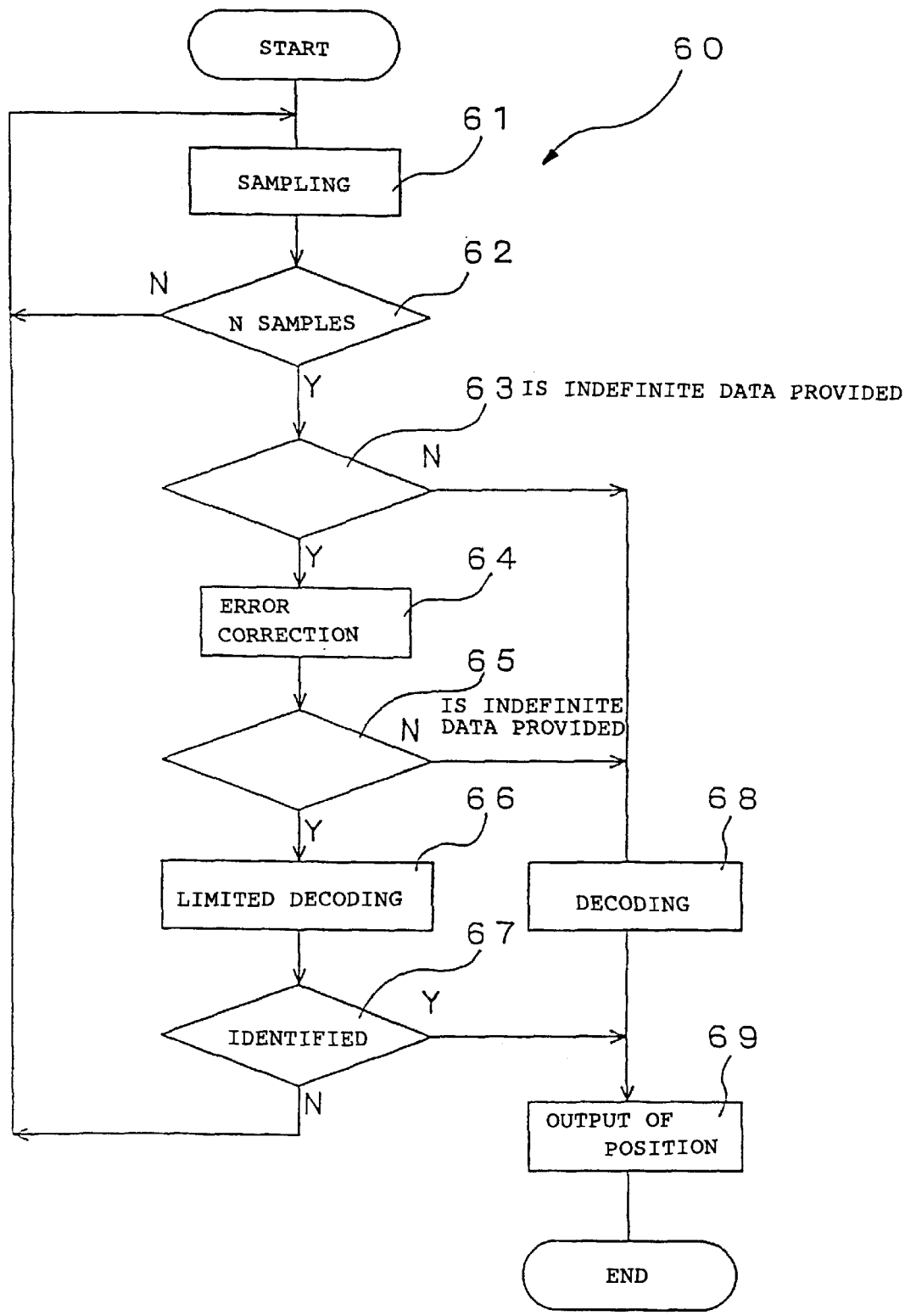
FIG. 11 is a flowchart indicating a position detecting process.

FIG. 11 shows a process for detecting an indicated position by the use of the identification section 5 of the present embodiment. FIG. 11 shows a process for detecting the position pointed by the minute hand. Since the decoding method in which the position of the hour hand is taken into consideration can be employed as described above to decode the position of the minute hand, FIG. 11 shows such a case. The position detecting method shown below as an example can also be used for that for the position pointed by the second hand or the minute hand if step 66, which performs limited decoding for a sub encoder surface, is excluded.

In a position detecting process 60 of the present embodiment, sampling of the identification patterns by the use of the magnetic sensor 21b starts in step 61 while the encoder plate (encoder surface) 17a is rotated. In this case, sampling may be performed at the specified angle (sampling point) while the encoder plate 17a is continually rotated or at a stable position after the encoder plate is rotated by one-step angle. As described above, sampling can be performed in an intermediate condition between these two conditions. At each sampling point, according to the first and second reference signals $\phi 4$ and $\phi 5$ sent from the reference-signal output section 26, a detection signal from the magnetic sensor 21b is classified into a first data 1 indicating it is confirmed that an identification mark is provided, a second data "0" indicating it is confirmed that no identification mark is provided, or a third data "*" indicating that it cannot be confirmed that an identification mark is provided, in the determination section 24.

In step 62, it is determined whether n samples are obtained to form a sampling code, and step 61 is repeated until n samples are obtained. In the present embodiment, since a sampling code has 12 bits, it is necessary to obtain 12 samples. When a sampling code is obtained, whether indefinite data "*" is included in the sampling code is determined in step 63. When "*" is not included, the process advances to step 68 since there is no erroneously detected data in the sampling code, and the obtained sampling code is decoded by the use of identification codes shown in FIG. 5 and recorded in the ROM 28 of the decoding section 27 to determine the indicated position. The identified indicated position is output to the control section 6, and the control section 6 performs automatic time correction and other processes according to the identified hand positions.

On the other hand, if the third data "*" indicating indefinite is included in the sampling code, with the use of the rules for the number (even number) of data "1" and that of data "0's" in an identification code as described above, error correction is performed in step 64 and the corrected sampling code is created. After error correction, whether the corrected sampling code includes the third data "*" indicating indefinite is determined in step 65. When the third data "*" is not included, since the sampling code has been corrected and the correct sampling code is obtained, the processing proceeds to step 68 and the indicated position is decoded as described above.

If the corrected sampling code still has the third data "*," error correction has not completely performed. In step 66, the sampling code is compared with limited identification codes according to the position pointed by the hour hand 13 and decoded. Step 66, which performs limited decoding, is executed when a position determining process for determining the position pointed by the hour hand 13 was performed and the position pointed by the hour hand 13 has been identified. The encoder surface 17a of the minute hand 12 is a sub encoder surface moving together with the encoder surface 18a of the hour hand 13, and the designated position on the encoder surface 17a can be limited according to the designated position on the encoder surface 18a. Since identification codes to be compared in the decoder section 27 can be limited as described above, even a sampling code having the third data "*" may be decoded. The decoding result is checked in step 67. When the indicated position is identified, the processing proceeds to step 69 and the identified indicated position is output to the control section 6.

When the indicated position is not identified from the sampling code even in the process in step 67, the processing returns to step 61. Data at the next sampling point is obtained and the foregoing steps are repeated until the indicated position is identified. Even when the indicated position is identified, it is possible to increase the reliability of the indicated position by repeating sampling to identify a plurality of indicated positions and determining whether those indicated positions are acceptable to each other.

As described above, the time-measuring apparatus 1 of the present embodiment can automatically recognize the positions pointed by the second hand 11, the minute hand 12, and the hour hand 13 by the use of the identification section 5. Therefore, according to the recognized pointed positions, automatic time correction can be performed with fast-forward operation and other processing. It is possible to incorporate into the time-measuring apparatus 1 of the present embodiment a function for recovering the current time after the time display has been stopped, a function for automatically correcting the time to the standard time in a zone in which the standard time is different from that in the original zone, and a function for compensating for a shift from the standard time.

The identification section 5, which performs position detection described above, can be configured with a special logical gate IC and other components by hardware. An identification portion according to the present invention is not limited to this identification section. It may be a unit provided with functions described in the claims of the present invention. It is also possible to achieve the function of an identification portion with the use of a microprocessor and a program having instructions for executing each process in the position detecting process 60 described above. This position detecting program can be recorded in a recording medium such as the ROM 28 from which data is read to the processor, and accommodated in the time-measuring apparatus or offered. When the identification portion is implemented by software, it is preferred that the detection signal from the magnetic sensor be amplified and digitally converted to a condition suited for software processing.

Since the identification pattern which can be applied to the surfaces of hand-movement wheels and a very small detection sensor such as a Hall device for detecting the identification pattern are used in the time-measuring apparatus 1 of the present embodiment, the apparatus can easily be incorporated into a compact, lightweight apparatus such as a watch. In the above embodiment, a time-measuring apparatus which moves hands by the use of a single motor is described. The hands can be moved by a plurality of motors. The processes for detecting the positions pointed by the second hand, the minute hand, and the hour hand can be started at the same time.

In the above embodiment, the encoders are moved. The sensors may be moved instead to determine the indicated positions. Both encoders and sensors may be moved to identify the indicated positions. The above-described identification pattern is just an example. An identification pattern according to the present invention is not limited to this pattern. As already described above, an identification mark can employ a rule in which an odd number of sampling points are given. In this case, it is necessary to assign at least three sampling points to one identification mark with indefinite data being taken into consideration. In the above embodiment, hard-magnetic thin film is used to apply the identification patterns to the encoder plates. Instead of the magnetic film, magnetic paste may be placed on the encoder plates to form identification patterns. Alternatively, optical identification patterns such as reflective ones may be provided to detect the identification patterns optically with an optical pickup. Other detection methods can also be employed.

In the above embodiment, according to the time-measuring apparatus serving as an electronic apparatus to which the present invention is applied, the position of the hour hand, the minute hand, or the second hand, which is a display unit of the time-measuring apparatus, is detected. The present invention is not limited to the time-measuring apparatus. It can also be applied to a display apparatus such as a rotation-type speedometer, and position detection and control for a linear-movement apparatus, such as positioning of the printer head of a printer. For example, analog speedometers have been used for many vehicles. There are usually an error between the indicated speed and the actual speed. By detecting the position pointed by the hand by the use of a position detecting apparatus and a position detecting method according to the present invention, and receiving actual-speed information from the outside, the speed indication can be compensated for its error. The reliability of the speedometer is improved and highly precise speed indication can be made possible especially for a vehicle to which tires other than the specified types of tires, that may increase errors in speed indication, are mounted.

With the use of a hand-position detecting apparatus and a hand-position detecting method according to the present invention, a time-measuring apparatus provided with a compensation function and a compensation apparatus can be offered in which hand-movement positional information obtained by a motor-pulse count method with the use of an IC is periodically compared even in usual hand movement with hand-movement positional information obtained from hand-position detection according to the present invention, and if a difference is found, it is determined that hand movement has an error and the indicated position is compensated.

As described above, in the present invention, the encoder plates on which a plurality of identification marks are discretely made such that the marks are detectable from the surfaces thereof are employed and absolute positions are detected by a plurality of sampling operations for the identification marks while the encoder plates are rotated. The third data which indicates that identification marks are not confirmed is provided so as not to interpret an indicated position erroneously due to data in which the identification marks are erroneously detected. With the use of the rules of the identification marks, the third data, which is indefinite, can be error-corrected. Therefore, even if a part of the identification marks are not detected in the position detecting apparatus of the present invention, the correct position can be identified within a short period of time without additional sampling.

In a position detecting apparatus and a position detecting method according to the present invention, it is required to prepare one-bit data at each sampling point. Sampled data is combined to form a sampling code and the code is decoded. Correct, absolute indicated positions can be detected. Therefore, an identification-mark detecting apparatus for detecting identification marks needs to have one sensor, and thereby the configuration of the position detecting apparatus is very simplified and its reliability is improved. The relative movement speed of the encoder plates may be low. Even if the encoder plates are moved step by step, since data indicating the indicated position is obtained, they are suited to a compact, portable apparatus such as a watch. It is also possible to integrate a function for detecting the hand positions of the time-measuring apparatus for automatic time correction.

Since an indicated position is determined from a sampling code obtained at a plurality of sampling points, an erroneous position is not identified even if data indicating erroneous detection is included in the sampling code. A detecting method can be employed in which error correction is performed first with the use of the rules of identification marks, and then a position is decoded. Therefore, an indicated position can be positively identified within a short period of time.

In the present invention, a detecting apparatus for detecting environmental conditions, which has the same characteristics as the detecting apparatus for an identification mark, is provided to compensate the strength of reference signals used for classifying a sampled detection signal, according to a change in the environmental conditions. Therefore, an identification mark can be correctly detected with the effects of a temperature change and external noise being eliminated, and highly precise information can be obtained. Since a position detecting apparatus of the present invention is provided with means for eliminating a difference caused by assembling errors by adjusting the sampling timing, an indicated position can be positively determined within a short period of time.

Industrial Applicability

Since a position detecting apparatus and a position detecting method according to the present invention identify the absolute positions of a hand and others with a simple configuration, they are very suited to automatic recognition of the positions of a compact apparatus such as a time-measuring apparatus and a display unit of a portable apparatus. According to the results, compensation and time correction can also be suitably performed.

We claim:

1. An electronic apparatus comprising:
a position detecting apparatus having an encoder plate having a plurality of detectable identification marks forming a single series of marks disposed thereon;
an identification-mark detecting means disposed in facing relationship with said encoder plate for detecting a plurality of said identification marks disposed on said encoder plate, a sampling code being generated by sequentially detecting said identification marks at a plurality of sampling points along said encoder plate to determine whether said identification marks are present, said detecting being performed while said encoder plate and said identification-mark detecting apparatus are in relative motion; and
an identification means for identifying an indicated position of said encoder plate according to said sampling code, said identification means having identification-mark determination means for outputting, at each of said sampling points, at least either a first data indicating that said identification mark is present and a second data indicating that no identification mark is present, or a third data indicating that the presence of said identification mark is undeterminable; and a decoder for decoding said sampling code formed by any combination of said first data, and said second data and said third data being output from said identification-mark determination apparatus to identify said indicated position of said encoder plate.

2. The electronic apparatus of claim 1, wherein said identification-mark detecting means has a sensor for outputting a detection signal in response to the sensing of an identification mark, the level of said detection signal depending on the presence of said identification mark; and
said identification-mark determination means has a first comparison apparatus for outputting said first data when said detection signal from said sensor is greater than a first reference signal and a second comparison apparatus for outputting said second data when the detection signal from said sensor is less than a second reference signal, said second reference signal being lower than said first reference signal.

3. The electronic apparatus of claim 2, wherein first reference signal being selected to be higher than the maximum value of said detection signal when said identification mark is not present, and said second reference signal being selected to be lower than the minimum value of said detection signal when said identification mark is present.

4. The electronic apparatus of claim 2, further comprising an environmental-condition detecting means for detecting an environmental condition and outputting an environmental condition signal in response thereto, said environmental-condition detecting means and said identification-mark detecting means have substantially the same detection characteristic; and
a compensation means for compensating at least one of said first reference signal and second reference signal and said detection signal in response to said environmental-condition signal.

5. The electronic apparatus of claim 1, wherein each of said identification marks include an even number of said sampling points and including a plurality of spaces on said encoder plate, one of said spaces being disposed in between each adjacent pair of said identification marks, each of said spaces including an even number of said sampling points, said identification marks and said spaces disposed on said encoder plate so as to form a plurality of boundaries between said identification marks and said spaces; and
said identification means identifying said position of said encoder plate according to said sampling code representing a sampling of points across more than one of said boundaries.

6. The electronic apparatus of claim 1, wherein said identification marks included an odd number of said sampling points and including a plurality of spaces, one of said spaces on said encoder plate being disposed between each adjacent pair of said identification marks, each of said spaces including an odd number of sampling points, said odd numbers each being at least three, said identification marks and said spaces disposed on said encoder plate so as to form a plurality of boundaries between said identification marks and said spaces; and
said identification means identifying said indicated position of said encoder plate according to said sampling code, said sampling code representing a sampling of points across more than one of said boundaries.

7. The electronic apparatus of claim 1, wherein said identification marks have an odd number of said sampling points, said odd number being at least three, and including a plurality of spaces on said encoder plate, one of said spaces being disposed between each adjacent pair of said identification marks, each of said spaces including an even number of said sampling points, said identification marks and said spaces disposed on said encoder plate so as to form a plurality of boundaries between said identification marks and said spaces; and said identification means identifying said position of said encoder plate according to said sampling code representing a sampling of points across more than one of said boundaries.

8. The electronic apparatus of claim 1, wherein said identification marks have an even number of said sampling points and including a plurality of spaces on said encoder plate, one of said spaces being disposed in between each adjacent pair of said identification marks, each of said spaces including an odd number of said sampling points, said odd number being at least three; said identification marks and said spaces disposed on said encoder plate so as to form a plurality of boundaries between said identification marks and said spaces; and said identification means identifying said position of said encoder plate according to said sampling code representing a sampling of points across more than one of said boundaries.

9. The electronic apparatus of claim 1, further comprising movement means for moving said encoder plate in a stepped manner, and timing adjustment means for adjusting the timing of said sampling in relation to the movement of said encoder plate.

10. The electronic apparatus of claim 1, wherein the number of said sampling points is greater than the number of said identifiable positions of said encoder plate.

11. The electronic apparatus of claim 1, wherein said identification mark is made of a magnetic thin film disposed on said encoder plate and said identification-mark detecting means includes a magnetic sensor for detecting the presence of said magnetic thin film.

12. The electronic apparatus of claim 1 further comprising:

a hand, said hand including at least one of a second hand, a minute hand, and an hour hand; and means for moving one of said encoder plate or said identification-mark detecting means, together with said hand, relative to the other.

13. The electronic apparatus of claim 12, farther comprising:

said identification means including storage means for storing a plurality of reference sampling codes, said identification means comparing said sample code with said stored reference sampling codes to identify the position of said encoder plate;

a sub encoder plate having a plurality of sub encoder detectable identification marks;

a second identification-mark detecting means disposed in facing relationship with said sub encoder plate for detecting said sub encoder identification marks, a second sampling code being generated by sequentially sampling said sub encoder identification marks at a plurality of sub encoder sampling points to determine whether said sub encoder identification marks are present, one of said sub encoder plate and second identification-mark detecting means being coupled to move with the one of said encoder plate and first mentioned sub encoder plate which moves, said sampling by said second identification-mark detecting means being performed while said one of said sub encoder plate and said second identification-mark detecting means is moving relative to the other; and said identification means being coupled to said second identification-mark detecting means for identifying the position of said sub encoder plate by comparing said second sampling code to a selected group of said reference sampling codes as determined by the sampling code determined from said encoder plate.

14. A timepiece comprising:

a position detecting apparatus including an encoder plate having a plurality of detectable identification marks forming a single series of identification marks disposed thereon;

an identification-mark detecting means disposed in facing relationship with said encoder plate for detecting a plurality of said identification marks disposed on said encoder plate, a sampling code being generated by sequentially detecting said identification marks at a plurality of sampling points along said encoder plate to determine whether said identification marks are present, said detecting being performed while said encoder plate and said identification-mark detecting apparatus are in relative motion;

an indication means for identifying the position of said encoder plate according to said sampling code; said identification means having identification-mark determination means for outputting, at each of said sampling points, at least either a first data indicating that said identification mark is present and a second data indicating that no identification mark is present, or a third data indicating that the presence of said identification mark is undeterminable; and a decoder for decoding said sampling code formed by any combination of said first data, and said second data and said third data being output from said identification-mark determination apparatus to identify said indicated position of said encoder plate and;

a hand, said hand including at least one of a second hand, a minute hand and an hour hand, one of said encoder plate and identification mark detecting means moving together with said hand.

15. A position detecting method comprising the steps of:

providing an encoder plate having a plurality of spaced detectable identification marks, forming a single series of identification marks thereon;

moving one of an identification-mark detector and said encoder plate relative to the other;

obtaining a sampling code by sequentially sampling a plurality of sampling points on said encoder plate with said identification-mark detector to determine whether said identification marks are present; and outputting, at each of said sampling points, at least either a first data indicating that said identification-mark is present a second data indicating that no identification-mark is present, or a third data indicating that the presence of said identification mark is undeterminable;

decoding said sampling code formed by any combination of said first data, second data, and third data identifying the position of said encoder plate by comparing said decoded sampling code to a plurality of reference sampling codes.

16. The position detecting method of claim 15, wherein all of said identification marks include one of an even and an odd number of said sampling points and including a plurality of spaces on said encoder plate, one of said spaces being disposed between each adjacent pair of said identification marks, said spaces including one of an even or an odd number of said sampling points, and the step of obtaining a sampling code further comprising the steps of:

obtaining at said sampling points one of a first data indicating that said identification mark is present, a second data indicating that no identification mark is present, and a third data indicating that it cannot be determined whether said identification mark is present;

generating a sampling code by sampling a plurality of sampling points; and correcting said sampling code by correcting third data based on a number of said first data and a number of second data of said sampling code.

17. The position detecting method of claim 15, further comprising the steps of:

providing a plurality of spaced sub encoder detectable identification marks on a sub encoder plate;

moving one of said sub encoder plate and a second identification-mark detector in unison with the one of said encoder plate and first mentioned identification-mark detector which moves relative to the other;

detecting said sub encoder identification marks with said second identification-mark detector;

obtaining a second sampling code by sequentially sampling a plurality of sub encoder sampling points on said sub encoder plate with said second identification-mark detector to determine whether said sub encoder identification marks are present; and identifying the position of said sub encoder plate by comparing said second sampling code to a selected group of said reference sampling codes as determined by the sampling code determined from said encoder plate.

18. The position detecting method according to claim 17, and including an hour hand of a time-measuring apparatus rotating with one of said encoder plate and said first mentioned identification-mark detector, and a minute hand of said time-measuring apparatus rotating with one of said encoder plate and second identification-mark detector.

19. A method for detecting a position of a hand in a timepiece comprising the steps of:

providing an encoder plate having a plurality of spaced detectable identification marks forming a single series of identification marks thereon;

moving one of an identification-mark detector and said encoder plate in unison with said hand, said hand including at least one of a second hand, a minute hand, and an hour hand while moving one of an identification-mark detector and said encoder plate relative to the other;

obtaining a sampling code by sequentially sampling a plurality of sampling points on said encoder plate with said identification-mark detector to determine whether said identification marks are present;

outputting, at each of said sampling points, at least either a first data indicating that said identification-mark is present, a second data indicating that no identification-mark is present, or a third data indicating that the presence of said identification mark is undeterminable;

decoding said sampling code formed by any combination of said first data, second data, and third data; and identifying the position of said encoder plate by comparing said sampling code to a plurality of reference sampling codes.

* * * * *